(12) United States Patent
Chen et al.

(10) Patent No.: US 11,279,795 B2
(45) Date of Patent: Mar. 22, 2022

(54) CURABLE COMPOSITION

(71) Applicant: 3M INNOVATIVE PROPERTIES COMPANY, St. Paul, MN (US)

(72) Inventors: Lianzhou Chen, Woodbury, MN (US); Michael S. Newman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 344 days.

(21) Appl. No.: 16/492,298

(22) PCT Filed: Jun. 26, 2018

(86) PCT No.: PCT/US2018/039508
§ 371 (c)(1),
(2) Date: Sep. 9, 2019

(87) PCT Pub. No.: WO2019/005800
PCT Pub. Date: Jan. 3, 2019

(65) Prior Publication Data
US 2021/0130535 A1 May 6, 2021

Related U.S. Application Data

(60) Provisional application No. 62/526,582, filed on Jun. 29, 2017.

(51) Int. Cl.
| | | |
|---|---|---|
| *C08G 59/32* | (2006.01) | |
| *C08G 59/50* | (2006.01) | |
| *C08F 110/08* | (2006.01) | |
| *C08L 9/02* | (2006.01) | |
| *C08L 71/02* | (2006.01) | |

(52) U.S. Cl.
CPC ....... *C08G 59/3227* (2013.01); *C08G 59/502* (2013.01); *C08F 110/08* (2013.01); *C08G 2170/00* (2013.01); *C08L 9/02* (2013.01); *C08L 71/02* (2013.01); *C08L 2207/04* (2013.01)

(58) Field of Classification Search
None
See application file for complete search history.

(56) References Cited

U.S. PATENT DOCUMENTS

| | | |
|---|---|---|
| 3,018,262 A | 1/1962 | Schroeder |
| 3,298,998 A | 1/1967 | Coover |
| 4,518,749 A | 5/1985 | Waddill |
| 4,800,222 A | 1/1989 | Waddill |
| 6,773,754 B2 | 8/2004 | Whiter |
| 2009/0048370 A1 | 2/2009 | Lutz |
| 2009/0099312 A1* | 4/2009 | Weber .............. C08G 65/33306 525/181 |
| 2009/0298969 A1 | 12/2009 | Attarwala |
| 2013/0115442 A1 | 5/2013 | Sang |

FOREIGN PATENT DOCUMENTS

| | | | |
|---|---|---|---|
| EP | 3170877 | 5/2017 | |
| WO | WO 2014-035655 | 3/2014 | |
| WO | WO-2014035655 A2 * | 3/2014 | ............. C08G 59/56 |
| WO | WO 2015/095296 | 6/2015 | |
| WO | WO 2016-137671 | 9/2016 | |

OTHER PUBLICATIONS

International Search Report for PCT International Application No. PCT/US2018/039508, dated Sep. 3, 2018, 5 pages.
Elias, Hans-George, *Macromolecules Chemical Structures and Synthesis*, vol. 1, pp. 75-77 (1999).
Elias, Hans-George, *Macromolecules Physical Structures and Properties*, Sixth Edition, vol. 2, pp. 28, 487-488 (2001).

* cited by examiner

*Primary Examiner* — Christopher M Rodd
(74) *Attorney, Agent, or Firm* — Philip P. Soo

(57) ABSTRACT

Provided are curable compositions including a base part comprising an amine-reactive curable resin and a curative part comprising a polymeric toughener dissolved in an amine. The polymeric toughener, optionally a rubbery polymer or thermoplastic polymer, is solid at ambient conditions with a weight average molecular weight of at least 5,000 g/mol while the amine is a liquid at ambient conditions. The curable composition is cured by mixing the base and curative parts with each other. Hardened compositions obtained thereof can achieve increased toughener loading, resulting in high peel and shear strength performance over a wide range of temperatures, including at temperatures exceeding 180° F. (82° C.).

15 Claims, No Drawings

CURABLE COMPOSITION

CROSS REFERENCE TO RELATED APPLICATIONS

This application is a national stage filing under 35 U.S.C. 371 of PCT/US2018/039508, filed Jun. 26, 2018, which claims the benefit of U.S. Provisional Patent Application No. 62/526,582, filed Jun. 29, 2017, the disclosures of which are incorporated by reference in their entirety herein.

FIELD OF THE INVENTION

Provided are two-part curable compositions. More particularly, the provided two-part curable compositions are paste adhesives that can be cured to form structural adhesives in, for example, automotive and aerospace applications.

BACKGROUND

In industrial manufacturing processes, adhesives are making their way into many fastening applications that traditionally use mechanical fixtures such as screws, rivets, and welds. Adhesives enjoy certain characteristic advantages over their mechanical counterparts—for example, adhesives can evenly distribute stress on the bonded parts, avoid galvanic corrosion, and even provide improved shock and vibration damping properties. These benefits are of particular value in bonding applications in the automotive and aerospace industries.

Adhesives used to bond structural elements are commonly referred to as structural adhesives. These adhesives are relied upon to provide structural integrity of the bonded assembly, where bond reliability is of great importance. Not only do these materials need to display sufficient adhesive strength, but they must retain these properties over a wide range of operating temperatures, environments, and stress conditions.

Optimizing the properties of a structural adhesive for a given application can be a significant engineering challenge. For instance, some thermosetting resin compositions, such as thermosetting epoxy compositions, exhibit high strength but are vulnerable to brittle fracture when subjected to impact conditions or cold temperatures. Using epoxy compositions that are less brittle can sometimes reduce bond strength, which is also undesirable.

SUMMARY

The aforementioned technical problem applies in particular when formulating structural adhesives based on two-part curable compositions. These are commonly made by mixing a multifunctional epoxy and a short chain aliphatic amine or cyclic aliphatic amine. The short chain aliphatic amine and cyclic aliphatic amine can lead to brittleness in the cured composition, which degrades peel performance of the adhesive assembly. Another issue sometimes encountered with lower viscosity amines is amine blushing, in which moisture in the air causes a side reaction with the amine. This can produce an undesirable oily or waxy appearance on the surface of the cured composition.

To overcome some of the above problems, toughening compounds can be mixed into thermosetting resin compositions to reduce brittleness while preserving or enhancing bond strength. For example, polymeric tougheners such as rubbery polymers have been used to increase the peel strength performance while retaining high adhesive performance at high temperatures.

Higher molecular weight tougheners were found to be significantly more effective than lower molecular weight tougheners. Yet, use of high molecular weight tougheners leads to another technical problem in relation to paste adhesives. In two-part epoxy compositions, these tougheners are traditionally dispersed into the epoxy resin. While this may be acceptable when forming adhesive films, it is problematic for paste adhesives because even moderate loadings of a high molecular weight solid polymer in the epoxy resin component tends to increase the viscosity beyond acceptable levels for manual mixing.

An answer to this apparent dilemma was discovered by dissolving rubbery and/or thermoplastic polymers into a low viscosity amine to produce an amine-polymer solution that itself functions as a curative (or hardener). The rubbery and/or thermoplastic polymer may or may not be reactive with the curable resin.

Integrating these polymeric tougheners into the curative part of a two-part curable composition is advantageous for several reasons. First, it enables a paste adhesive that can be mixed and cured at room temperature. Second, these adhesives can yield high peel and shear strength performance over a wide range of temperatures when cured, including temperatures exceeding 180° F. (82° C.). Finally, the addition of the rubbery and/or thermoplastic polymers was also found to mitigate the amine blush effect normally associated with low viscosity amines. These compositions thus overcome many of the issues related to prior art approaches.

Applications of these compositions need not be limited to structural bonding of epoxies. In some instances, the amine-polymer solution can not only be used to harden epoxy resins but also polyisocyanate-based resins. In some embodiments, these amine-polymer solutions can be used as curatives in composite adhesive applications such as in infusion coating and polyurea applications.

In one aspect, a curable composition is provided, comprising: a base part comprising an amine-reactive curable resin; and a curative part comprising a polymeric toughener dissolved in an amine, the polymeric toughener being solid at ambient conditions with a weight average molecular weight of at least 5,000 g/mol and the amine being a liquid at ambient conditions, wherein the curable composition can be cured by mixing the base and curative parts with each other.

In a second aspect, a cured adhesive composition is provided, based on curing the aforementioned curable composition.

In a third aspect, a method of making a two-part curable composition is provided, the method comprising: providing a base part comprising one or more amine-reactive curable resins; and obtaining a curative part by dissolving a polymeric toughener in an amine that is liquid at ambient conditions, wherein the polymeric toughener comprises a rubbery polymer, thermoplastic polymer, or combination thereof, each polymeric toughener being solid at ambient conditions and having a weight average molecular weight of at least 5,000 g/mol; wherein the base part and curative part are reactive upon mixing with each other to obtain a cured composition.

In a fourth aspect, a method of curing a composition is provided, the method comprising: dissolving a polymeric toughener in an amine to obtain a curative, wherein the polymeric toughener comprises a rubbery polymer, thermoplastic polymer, or combination thereof, each polymeric toughener being solid at ambient conditions and having a weight average molecular weight of at least 5,000 g/mol, and the amine being a liquid at ambient conditions; and mixing the curative with an amine-reactive curable resin to obtain a cured composition.

Definitions

As used herein:

"ambient conditions" refers to a temperature of 25° C. and 101.3 kPa (1 atmosphere) pressure;

"ambient temperature" refers to a temperature of 25° C.;

"amino" refers to a chemical group containing a basic nitrogen atom with a lone pair (—NHR), and may be either a primary or secondary chemical group;

"average" generally refers to a number average but, when referring to particle diameter, can either represent a number average or volume average;

"cure" refers to the hardening of a polymeric material achieved by crosslinking of polymer chains;

"dissolve" refers to a solid becoming incorporated into a liquid so as to form a homogeneous solution;

"fully cured" refers to a polymeric material that has sufficiently cured to be useful in its intended application;

"halogen" group, as used herein, means a fluorine, chlorine, bromine, or iodine atom, unless otherwise stated;

"particle diameter" represents the largest transverse dimension of a particle;

"polyamine" refers to a compound having an amine functionality of two or more;

"polymer" refers to a compound having at least one repeating unit and can include copolymers;

"polyol" refers to a compound having a hydroxyl functionality of two or more;

"sub-micron particles" refers to particulate filler having an average diameter of less than 1 micrometer (which can include nanoparticles having an average diameter of less than 100 nanometers);

"substituted" as used herein in conjunction with a molecule or an organic group as defined herein refers to the state in which one or more hydrogen atoms contained therein are replaced by one or more non-hydrogen atoms;

"functionality" refers to a group that can be or is substituted onto a molecule or onto an organic group. Examples of functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

DETAILED DESCRIPTION

This disclosure pertains to curable compositions and related methods thereof capable of being used for structural bonding applications. Such bonding applications may include bonding to a variety of substrates, including but not limited to polymeric and metal substrates.

Useful bonding applications include aerospace bonding applications, such as the bonding of skins, stringers, honeycomb materials, and other primary aircraft structures. Other useful bonding applications are in the automotive area, and may involve metal to metal bonding to a frame or another automotive structure.

The provided curable compositions are referred to as two-component ("2K"), or two-part, paste adhesive compositions because they require the mixing of two distinct parts. One is commonly referred to as a base part containing one or more curable resins, while the other is a curative part containing components reactive with the curable resin. The base and curative parts react upon mixing with each other and eventually form a cured (or hardened) adhesive. The process of curing is not instantaneous, but happens gradually so that an operator has sufficient working time to apply and shape the adhesive, as needed, for the application at hand.

In exemplary methods of use, the base part and curative part of the curable composition are mixed with each other shortly before applying the composition to either bonding surface. Once mixed, the composition is ready for application and may be dispensed onto one or both bonding surfaces in a bead or layer, as appropriate.

In some embodiments, curing can occur at ambient temperature. If desired, however, curing could be accelerated by heating the mixed composition to elevated temperatures. The gelation time, or time at which the adhesive reaches a fully cured state, can be from 0.25 hours to 8 hours, 0.5 hours to 6 hours, 1 hour to 4 hours, or in some embodiments, less than, equal to, or greater than 0.25 hours, 0.5, 0.75, 1, 1.5, 2, 2.5, 3, 3.5, 4, 4.6, 5, 6.5, 7, 7.5, or 8 hours.

The steps used to prepare and cure the provided curable compositions can be carried out by any number of entities within a manufacturing supply chain. In some instances, a manufacturer may prepare and package a two-part curable composition for a customer, who then uses the two-part curable composition in an automotive or aerospace manufacturing, maintenance, or repair process. In other instances, the end user may participate at least in part in formulating and mixing the base part and/or curative part of the curable composition.

When cured, the provided curable compositions can achieve acceptable adhesive peel and shear strength at temperatures exceeding 180° F. (82° C.), and in some cases at temperatures of up to 350° F. (177° C.).

In a two-part composition, the base and curative parts are stored separately, enabling the curable composition to have a long shelf life even when stored at ambient temperature. In some applications, it can be convenient to provide these materials in disposable cartridges for storage and dispensing, such as in the 3M™ EPX™ Applicator System, available from 3M Company, St. Paul, Minn.

The base part of the two-part curable composition includes at least one curable resin that is amine-reactive. In some embodiments, one or more of the curable resins are epoxy resins.

Epoxy resins are useful matrix materials for high-performance composites and adhesives. They have an excellent combination of strength, adhesion, low shrinkage, and processing versatility. The base part can include one or more epoxy resins. In some cases, the base part contains a major epoxy and one to three minor epoxies. Minor epoxies can be added to provide viscosity control, impart higher elevated temperature properties, provide lower moisture absorption or to improve toughness.

An epoxy resin has a chemical structure containing a 3-member cyclic ether group, also referred to as an epoxide (or glycidyl) group. The epoxy resin may contain more than one epoxide group, in which case it is referred to as a polyepoxide. Epoxy resins may be saturated or unsaturated, aliphatic, alicyclic, aromatic, or heterocyclic, or a combination thereof. The epoxy resins are hardened by the addition of a curative. Exemplary curatives include anhydrides, amines, polyamides, Lewis acids, salts and others.

Aromatic polyepoxides contain at least one aromatic ring (such as a phenyl group) that is optionally substituted by a halogen, alkyl having 1 to 4 carbon atoms (e.g., methyl or ethyl), or hydroxyalkyl having 1 to 4 carbon atoms (e.g., hydroxymethyl). In some embodiments, the aromatic polyepoxide contains at least two or more aromatic rings and in some embodiments, can contain 1 to 4 aromatic rings. For polyepoxides and epoxy resin repeating units containing two or more aromatic rings, the rings may be connected, for example, by a branched or straight-chain alkylene group having 1 to 4 carbon atoms that may optionally be substituted by a halogen (e.g., fluoro, chloro, bromo, iodo).

In some embodiments, the epoxy resin is a novolac epoxy resin (e.g., phenol novolacs, ortho-, meta-, or para-cresol novolacs or combinations thereof) containing more than two epoxy groups per molecule. Novolac epoxy resins can be obtained by reacting a phenolic novolac resin with epichlorohydrin. When cured, these resins can provide increased crosslink density due to the increased epoxy functionality, such as provided by a multifunctional epoxy having an average functionality of greater than 2, greater than 3, greater than 4, greater than 5, or greater than 6. The epoxy resin may also include a bisphenol epoxy resin (e.g., bisphenol A, bisphenol E, bisphenol F, halogenated bisphenol epoxies, fluorene epoxies, and combinations thereof), a resorcinol epoxy resin, and combinations of any of these.

Particular aromatic monomeric polyepoxides include the diglycidyl ethers of bisphenol A and bisphenol F and tetrakis glycidyl-4-phenylolethane and combinations thereof. In these aromatic polyepoxides, either of the phenyl rings or the methylene group may be substituted by halogen (e.g., fluoro, chloro, bromo, iodo), methyl, trifluoromethyl, or hydroxymethyl. Useful aromatic polyepoxides also include polyglycidyl ethers of polyhydric phenols, glycidyl esters of aromatic carboxylic acid, N-glycidylaminobenzenes, and glycidylamino-glyclidyloxy-benzenes.

Polyglycidyl derivatives of polyhydric phenols include 2,2-bis-[4-(2,3-epoxypropoxy)phenyl]propane and those described in U.S. Pat. No. 3,018,262 (Schroeder) and U.S. Pat. No. 3,298,998 (Coover et al.), and in "Handbook of Epoxy Resins" by Lee and Neville, McGraw-Hill Book Co., New York (1967). Useful polyglycidyl ethers of polyhydric phenols described above are diglycidyl ethers of bisphenol that have pendent carbocyclic groups. Examples of such diglycidyl ethers are 2,2-bis[4-(2,3-epoxypropoxy)phenyl] norcamphane and 2,2-bis[4-(2,3-epoxypropoxy)phenyl] decahydro-1,4,5,8-dimethanonaphthalene. Useful polyglycidyl derivatives include 9,9-bis[4-(2,3-epoxypropoxy) phenyl]fluorene and tetraglycidyl methylene dianiline (TGMDA), also known as tetraglycidyl-4,4 N-diaminodiphenylmethane (TGGDM).

An epoxy resin present in the base part of the curable composition can be any proportion of the curable composition suitable to obtain the desired physical and chemical properties after the composition is cured. The epoxy resin can represent from 30 wt % to 60 wt %, 40 wt % to 55 wt %, or 45 wt % to 50 wt % of the curable composition, or in some embodiments, less than, equal to, or greater than 30 wt %, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % of the curable composition.

Where an epoxy resin in the base part is a multifunctional epoxy having an average functionality greater than 2, the epoxy resin can represent from 0.1 wt % to 70 wt %, 5 wt % to 50 wt %, or 5 wt % to 40 wt % of the curable composition, or in some embodiments, less than, equal to, or greater than 0.1 wt %, 0.2, 0.3, 0.5, 0.7, 1, 2, 3, 5, 7, 10, 12, 15, 18, 20, 25, 30, 35, 40, 45, 50, 55, 60, 65, or 70 wt % of the curable composition.

The base part of the curable composition may contain one or more curable resins that are not epoxy resins. These curable resins can also be amine-reactive. Such curable resins can include, for example, polyisocyanates, acrylates, liquid bismaleimides and other amine-reactive resins. The base part may also contain combinations of one or more of these resins with any of the epoxy resins disclosed herein, or with each other.

The curative part of the curable composition contains one or more aliphatic or cyclic amines. Generally, these amines are capable of reacting with multifunctional epoxy resins in the base part to form a highly cross-linked resin matrix. In various embodiments, the amines are selected from the group consisting of cycloaliphatic amines, polyethylene polyamines, amine-terminated piperazines, imidazoles, and combinations thereof.

Of the amines in the curative part, at least one amine is a liquid under ambient conditions. Exemplary liquid amines include, but are not limited to, tetraethylenepentamine, N-aminoethylpiperazine, bis(aminopropyl)piperazine, diethylenetriamine, triethylenetetramine, 4,7,10-trioxatridecane-1,13-diamine, octahydro-4,7-methano-1H-indenedimethylamine, bicyclo[2.2.1]heptanebis(methylamine), meta-xylenediamine, isophoronediamine, cyclohexanediamine, and combinations thereof.

In some embodiments, the liquid amine is a primary amine. In some embodiments, the amine has a cyclic structure. Beneficially, having a cyclic structure can enhance the high temperature performance of the paste adhesive. Octahydro-4,7-methano-1H-indenedimethylamine, sometimes referred to as TCD-diamine, has the chemical structure (I) below:

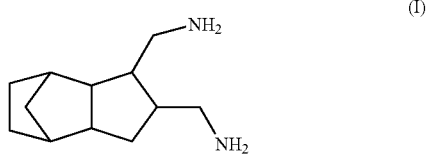 [SMILES: NCC1CC2C3CCC(C3)C2C1CN]

(I)

The same amine may be expressed more generically by the chemical structure (II) below:

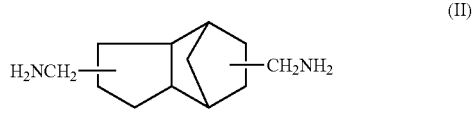

(II)

Another useful amine is bicyclo[2.2.1]heptanebis(methylamine), also sometimes referred to as norbornane diamine (NMDA):

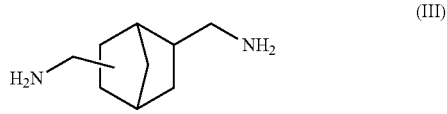

(III)

The amine preferably has a low viscosity at ambient conditions, in which a significant amount of a rubbery polymer or thermoplastic polymer can be dissolved to yield a solution that nonetheless retains an acceptable viscosity for handling and mixing by an operator.

The viscosity of the amine alone can range from 1 centipoise to 10,000 centipoise, 1 centipoise to 1000 centipoise, or 1 centipoise to 500 centipoise under ambient conditions, or in some embodiments, be less than, equal to, or greater than, 1 centipoise, 2; 5; 8; 10; 15; 20; 25; 30; 35; 40; 50; 60; 70; 80; 90; 100; 120; 150; 200; 300; 400; 500; 700; 1,000; 1,500; 2,000; 2,500; 3,000; 4,000; 5,000; 6,000; 7,000; 8,000; 9,000; or 10,000 centipoise under ambient conditions. Viscosity can be measured, for example, by a Brookfield LV-series viscometer provided by Brookfield AMETEK, Middleboro, Mass.

The amine can be any proportion of the curable composition suitable to obtain suitable physical and chemical properties after the composition is cured, subject to upper limits of acceptable viscosity in the curative part of the curable composition. In some embodiments, the amine represents from 45 wt % to 95 wt %, 50 wt % to 95 wt %, or 60 wt % to 95 wt % of the curable composition, or in some embodiments, less than, equal to, or greater than 45 wt %, 46, 47, 48, 49, 50, 51, 52, 53, 54, 55, 56, 57, 58, 59, 60, 65, 70, 75, 80, 85, 90, 91, 92, 93, 94, or 95 wt % of the curable composition.

The curative part of the curable composition further includes a polymeric toughener that is a solid and yet soluble in the liquid amine. The polymeric toughener can a rubbery polymer, thermoplastic resin, or mixture thereof. The polymeric toughener may be linear or branched.

Rubbery polymers include polytetrahydrofuran amine, polybutadiene, acrylonitrile butadiene rubber, and copolymers and blends thereof. Commercial examples include "3M EPX rubber" high molecular weight amine terminated polytetramethylene oxide by 3M Company, St. Paul, Minn. and nitrile rubber such as NIPOL 1072 and NIPOL 1001CG, by ZEON Chemicals, Louisville, Ky. The rubbery polymer can have a glass transition temperature of less than 20° C., 15, 10, 5, 0, −5, −10, −15, −20, −25, −30, −35, −40, −45, −50, −55, −60, or −65° C.

Thermoplastic resins include poly(hydroxyl ether of bisphenol A), poly(phenyl oxide), poly(ether ether ketone), poly(ether sulfone), poly(vinyl butyral), poly(methyl methacrylate), polyamide, and copolymers and blends thereof.

In some embodiments, the polymeric toughener contains one or more functional groups that are reactive with the curable resin. Suitable functional groups include amine groups and hydroxyl groups. Reactive amine groups are generally primary amines or secondary amines.

The polymeric toughener can have, on average, 1 to 2.5 primary amine groups per molecule, 1.2 to 2.4 primary amine groups per molecule, 1.5 to 2.3 primary amine groups per molecule, or in some embodiments, less than, equal to, or greater than 1, 1.1, 1.2, 1.3, 1.4, 1.5, 1.6, 1.7, 1.8, 1.9, 2, 2.1, 2.2, 2.3, 2.4 primary amine groups per molecule.

It can be preferable for the polymeric toughener to be of high molecular weight for greater effectiveness as a toughener. It has been found, in particular, that inclusion of a high molecular weight polytetrahydrofuran amine results in substantially better peel performance than compositions containing lower molecular weight polytetrahydrofuran amine (see Examples).

Polymeric tougheners based on rubbery polymers cab have weight average molecular weights of from 5,000 g/mol to 1,000,000 g/mol; from 8,000 g/mol to 1,000,000 g/mol; or from 10,000 g/mol to 1,000,000 g/mol. Polymeric tougheners based on thermoplastic polymers can have weight average molecular weights of from 5,000 g/mol to 10,000,000 g/mol; from 10,000 g/mol to 10,000,000 g/mol; or from 20,000 g/mol to 10,000,000 g/mol.

The polymeric toughener in general can have a weight average molecular weight less than, equal to, or greater than, 5,000 g/mol; 6,000; 7,000; 8,000; 9,000; 10,000; 12,000; 15,000; 17,000; 20,000; 25,000; 30,000; 35,000; 40,000; 45,000; 50,000; 60,000; 70,000; 80,000; 90,000, 100,000; 120,000; 150,000; 200,000; 250,000; 300,000; 350,000; 400,000; 450,000; 500,000; 600,000; 700,000; 800,000; 900,000; 1,000,000, 5,000,000; or 10,000,000 g/mol.

The polymeric toughener can be any proportion of the curable composition suitable to obtain a desired impact resistance after the composition is cured, subject to upper limits of acceptable viscosity in the curative part of the curable composition. In some embodiments, the polymeric toughener represents from 1 wt % to 60 wt %, 5 wt % to 40 wt %, or 5 wt % to 30 wt % of the curable composition, or in some embodiments, less than, equal to, or greater than 1 wt %, 2, 3, 4, 5, 6, 7, 8, 9, 10, 11, 12, 13, 14, 15, 16, 17, 18, 19, 20, 22, 24, 26, 28, 30, 35, 40, 45, 50, 55, or 60 wt % of the curable composition.

Advantageously, dissolving high molecular weight polymer tougheners into the liquid amine of the curable part enables overall higher loadings of such tougheners into curable composition. Such loadings can be significantly higher than in conventional two-part adhesive compositions where high molecular weight polymer tougheners are not dissolved into the liquid amine. The benefit is even greater when using a low viscosity amine, which affords an even greater margin to load high molecular weight polymer tougheners while retaining acceptable viscosity.

If desired, high molecular weight polymers can also be present in the base part of the curable resin, but the high viscosity of the epoxy will limit the amount of the high molecular weight polymers that we can put in. By allocating all or part of high molecular weight polymer into the curative part of the curable composition, it can be possible to load more toughener into the overall curable composition and/or use a higher viscosity epoxy in the base part of the curable composition.

Optionally, the base part of the provided curable compositions can contain the same rubbery polymer and/or thermoplastic polymer that has been dissolved in the liquid amine of the curative part. It may even be possible to incorporate limited amounts of a solid epoxy resin in the base part to the extent it is soluble therein.

A viscosity mismatch between the base and curative parts can complicate mixing. Thus, it can be beneficial for one or more polymeric tougheners to be present in the base part if addition of the one or more polymeric tougheners help balance the respective viscosities of the base and curative parts and improve the ease and quality of mixing.

The overall amount of one or more polymeric tougheners in the base part or curative part of the curable composition need not be particularly restricted. In exemplary embodiments, the overall amount of polymeric toughener can represent from 1 wt % to 60 wt %, 5 wt % to 40 wt %, 5 wt % to 30 wt %, or in some embodiments, less than, equal to, or greater than 1 wt %, 2, 3, 4, 5, 6, 7, 8, 9, 10, 11, 12, 13, 14, 15, 16, 17, 18, 19, 20, 22, 24, 26, 28, 30, 35, 40, 45, 50, 55, or 60 wt % of the base part or curative part of the curable composition.

The weight ratio between the polymeric toughener in the curative part and the polymeric toughener in the base part can be adjusted as appropriate to achieve a desired viscosity profile as noted above. In exemplary embodiments, the weight ratio can be from 10:0 to 9:1, from 9:1 to 7:3, from 7:3 to 1:9, or in some embodiments, less than, equal to, or greater than, 0:10, 1:9, 2:8, 3:7, 4:6, 5:5, 6:4, 7:3, 8:2, 9:1, or 9.5:0.5.

The curable composition may contain any number of other useful optional additives. Useful additives include, for example, additional curatives, curing catalysts or accelerators, adhesion promoters, fillers, rheology modifiers, pigments, additional rubbers, diluents (which may be reactive), plasticizers, extenders, fire-retarding agents, thixotropic agents, flow control agents, thickeners such as thermoplastic polyesters, gelling agents such as polyvinylbutyral, fillers, dyes, and antioxidants.

The provided curable compositions may, for example, contain one or more curing accelerators. Curing accelerators can include, for example, calcium nitrate tetrahydrate or calcium nitrate dehydrate and tertiary amine accelerators such as 2,4,6-tri(dimethylaminomethyl) phenol, such as described in U.S. Pat. No. 4,518,749 (Waddill), U.S. Pat. No. 4,800,222 (Waddill), and U.S. Pat. No. 6,773,754 (Whiter). Such accelerators can be incorporated into either the base or curative part to reduce the time to gelation, or curing time.

In a preferred embodiment, either or both the base part and curative part of the provided curable compositions contain core shell particles. Core shell particles are filler particles having two or more distinct concentric parts—a core and at one or more shell layers surrounding the core. In some embodiments, the core shell particle is a core shell rubber (CSR) particle having an elastomeric core and made from either a physically crosslinked or microphase-separated polymer, while the shell layer is made from a non-elastomeric glassy polymer. Advantageously, the rubbery, elastomeric core can enhance toughness in the cured resin composition, while the glassy polymeric shell can impart improved compatibility between the filler particle and the matrix component of the curable resin.

In exemplary composite applications, the core shell particles can have a particle diameter in the range of from 10 nm to 800 nm, from 50 nm to 500 nm, or from 80 nm to 300 nm, or in some embodiments, less than, equal to, or greater than 5 nm, 10, 20, 30, 40, 50, 70, 100, 200, 300, 400, 500, 600, 700, 800, 900, or 1000 nm.

The core shell particles may be uniformly dispersed in the composition, or at least partially aggregated. Aggregated core shell particles may be in physical contact with one or more other core shell particles. In some embodiments, the core shell particles form long chains of aggregated particles that extend across the bulk of the curable resin. Such aggregated core shell particle chains may be linear or branched. The core shell particle chains may themselves be uniformly distributed throughout the bulk of the curable resin. The configuration of such aggregates can be substantially preserved when the curable composition is cured.

The particle diameter distribution of the core shell particles can be monomodal or multimodal. A monomodal particle diameter distribution is characterized by a single peak (or mode) in a particle diameter distribution, while a multimodal distribution is characterized by two or more peaks in the particle diameter distribution. A multimodal distribution can be a bimodal distribution characterized by exactly two peaks, a trimodal distribution with exactly three peaks, and so forth.

In some embodiments, the multimodal distribution of the core shell particles has a first mode (as determined by transmission electron microscopy) characterized by a particle size "D1" in the range of from 120 nm to 500 nm, 160 nm to 425 nm, or 200 nm to 350 nm. In some embodiments, the particle size of the first mode is less than, equal to, or greater than 100 nm, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 nm.

A multimodal distribution of the core shell particles also displays a second mode characterized by a particle diameter "D2" less than that corresponding to the first mode. In some embodiments, D2 is in the range of from 30 nm to 200 nm, 40 nm to 150 nm, or 50 nm to 100 nm. In some embodiments, the particle size of the first mode is less than, equal to, or greater than, 30 nm, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm.

As described herein, the first and second modes are defined relative to each other such that the particle diameter of the first mode D1 is greater than the particle diameter of the second mode, D2. In some embodiments, the ratio D1:D2, is at least 1.5:1, at least 2:1, at least 4:1, or at least 10:1. Generally, the ratio of D1:D2 is no greater than 10:1. In some embodiments, the ratio D1:D2 is less than, equal to, or greater than 1.5:1, 2:1, 3:1, 4:1, 5:1, 6:1, 7:1, 8:1, 9:1, or 10:1.

In some embodiments, the elastomeric core is comprised of a polymer having a low glass transition temperature enabling rubbery behavior, such as less than 0° C., or less than 30° C. More broadly, the glass transition temperature of the core polymer can be in the range of −100° C. to 25° C., −85° C. to 0° C., or −70° C. to −30° C., or in some embodiments, less than, equal to, or greater than −100° C., −95, −90, −85, −80, −75, −70, −65, −60, −55, −50, 45, −40, −35, −30, −25, −20, −15, −10, −5, 0, 5, 10, 15, 20, or 25° C.

Suitable core polymers broadly include various rubbers and polymers and copolymers of conjugated dienes, acrylates, and methacrylates. Such polymers can include, for example, homopolymers of butadiene or isoprene, or any of a number of copolymers of butadiene or isoprene with one or more ethylenically unsaturated monomers, which may include vinyl aromatic monomers, acrylonitrile, methacrylonitrile, acrylates, and methacrylates. Alternatively or in combination with the above, the core polymer could include a polysiloxane rubber-based elastomer.

The shell polymer need not be particularly restricted and can be comprised of any suitable polymer, including thermoplastic and thermoset polymers. Optionally, the shell polymer is crosslinked. In some embodiments, the shell polymer has a glass transition temperature greater than ambient temperature, i.e., greater than 25° C. The glass transition temperature of the shell polymer can be in the range of 30° C. to 170° C., 55° C. to 150° C., or 80° C. to 130° C.; or in some embodiments, less than, equal to, or greater than 30° C., 35, 40, 45, 50, 55, 60, 65, 70, 75, 80, 85, 90, 95, 100, 105, 110, 115, 120, 125, 130, 135, 140, 145, 150, 155, 160, 165, or 170° C.

Suitable shell polymers include polymers and copolymers of dienes, acrylates, methacrylates, vinyl monomers, vinyl cyanides, unsaturated acids and anhydrides, acrylamides, and methacrylamides. Specific examples of suitable shell polymers include, poly(methylmethacrylate), polystyrene, polyacrylonitrile, polyacrylic acid, and methylmethacrylate butadiene styrene copolymer.

The relative proportions of the core polymer and shell polymer in a given core shell particle need not be restricted.

In some embodiments, the core represents on average 50 wt % to 95 wt % of the core shell particles while the outer shell represents or 5 wt % to 50 wt % of the core shell particles. In other embodiments, the outer shell layer represents on average from 0.2 wt % to 7 wt % of the core shell particle. In further embodiments, the outer shell layer represents on average less than, equal to, or greater than, 0.1 wt %, 0.2, 0.3, 0.4, 0.5, 0.7, 1, 2, 3, 4, 5, 6, 7, 8, 9, 10, 12, 15, 17, 20, 25, 30, 35, 40, 45, or 50 wt % of the core shell particle.

In some embodiments, each core shell particle includes one or more polymeric intermediate shell layers disposed between the elastomeric core and the outer shell layer. The introduction of an intermediate layer provides another way to tailor the chemical and physical properties of the core shell particles. It may be advantageous, for instance, to provide an intermediate layer that acts as a primer, or tie layer, that improves adhesion between the core polymer and outer shell polymer. Use of an intermediate layer can also help adjust the rheological properties of the composition while preserving particular interfacial characteristics between the outer shell polymer and matrix component of the curable composition. In various embodiments, the polymeric outer shell layer has a greater degree of unsaturation (e.g., having a greater density of double-bonds) than that of the polymeric intermediate layer. This aspect is shown by the transmission electron micrograph of FIG. 2 (also referred to in the Examples), in which the osmium tetroxide appears to preferentially stain the double-bond-rich outer shell of the core shell particles.

An intermediate layer, like the outer shell layer, may be polymerized in situ from any of a number of suitable monomers known in the art, including monomers useful for the outer shell layer. An intermediate layer can be, for example, derived from a polymer or copolymer of an acrylate, methacrylate, isocyanuric acid derivative, aromatic vinyl monomer, aromatic polycarboxylic acid ester, or combination thereof, while the outer shell layer can be, for example, derived from a polymer or copolymer of an acrylate, methacrylate, or combination thereof.

Dispersing core shell particles into a curable composition, and particularly a curable composition based on an epoxy resin, can improve the toughness of the cured composition in different ways. As an example, the core polymer can be engineered to cavitate on impact, which dissipates energy. Core shell particles can also intercept and impede the propagation of cracks and relieve stresses that are generated during the curing of the matrix resin material.

The core shell particles can be any proportion of the curable composition suitable to obtain the desired impact resistance after the composition is cured. In some embodiments, the core shell particles represent from 0.1 wt % to 20 wt %, 1 wt % to 20 wt %, 5 wt % to 15 wt % of the curable composition, or in some embodiments, less than, equal to, or greater than 0.1 wt %, 0.2, 0.3, 0.5, 0.7, 1, 1.5, 2, 2.5, 3, 4, 5, 6, 7, 8, 9, 10, 11, 12, 13, 14, 15, 16, 17, 18, 19, or 20 wt % of the curable composition.

In an exemplary embodiment, the curable composition is comprised of an 50:50 wt %:wt % blend of Bisphenol A and Bisphenol F epoxy resins, and 5 wt % of a core shell particle filler with a bimodal particle size distribution.

Core shell particles can be made using any known method. In one method, core shell particles are made by a graft polymerization method in which a shell monomer, such as a vinyl polymerizable monomer, is graft polymerized onto the surface of a crosslinked rubber core polymer whereby covalent bonds connect the core and shell layer. A similar method can be used to dispose an outer shell polymer onto an intermediate layer, which is in turn disposed on the crosslinked rubber core.

Preparation of the elastomeric cores of the core shell particles can take place using a seed emulsion polymerization method. In this process, a seed latex is initially prepared by emulsion polymerization and acts as nucleation sites for further polymerization. The seed latex particles are then subjected to a growth step in which they are swollen with additional monomer to grow the particles to a larger size, after which the monomer is polymerized. Further details concerning this process are described, for example, in U.S. Patent Publication No. 2009/0298969 (Attarwala et al.).

Suitable core shell particles having properties described therein are commercially available dispersions in an epoxy resin matrix, such as available from Kaneka North America LLC, Pasadena, Tex. Useful dispersions include, for example, KANEKA MX-120 (masterbatch of 25 wt % micro-sized core-shell rubber in a diglycidyl ether of bisphenol A matrix).

In preparing the curable composition, masterbatches of core shell particles can be diluted with epoxy resin as appropriate to obtain the desired loading. This mixture can then be mechanically mixed, optionally with any remaining component or components of the curable composition.

As a further option, the provided curable compositions can contain any of a variety of inorganic sub-micron particles known in the art. Inorganic sub-micron particles include, for example, inorganic nanoparticles. Such particles may be present in the base part, curative part, or both.

Exemplary additives may include one or more of silica gels, calcium silicates, phosphates, molybdates, fumed silica, carbon black, clays such as bentonite, organo-clays, aluminium-trihydrates, hollow-glass-microspheres; hollow-polymeric microspheres and calcium carbonate. In some embodiments, these fillers can be used to adjust modulus, promote adhesion, improve corrosion resistance, control the rheological properties of the adhesive, and/or reduce shrinkage during curing.

Exemplary commercial fillers include SHIELDEX AC5 (a synthetic amorphous silica, calcium hydroxide mixture available from W. R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Dusseldorf, Germany); glass-beads class IV (250-300 microns): Micro-billes de verre 180/300 (available from CVP S. A. in France); glass bubbles K37: amorphous silica (available from 3M Deutschland GmbH in Neuss, Germany); MINSIL SF 20 (available from Minco Inc., 510 Midway, Tenn., USA); amorphous, fused silica; and APY-RAL 24 ESF (epoxysilane-functionalized (2 wt %) aluminium trihydrate available from Nabaltec GmbH in Schwandorf, Germany).

Inclusion of small amounts of inorganic sub-micron particles can provide a significant increase of modulus in the cured composition. Advantageously, this increase in modulus can partially or fully offset the decrease in modulus attributable to the presence of core shell particles in the curable composition while preserving the high degree of fracture toughness imparted by the core shell particles.

Useful sub-micron particles can include surface-bonded organic groups that serve to improve compatibility between the inorganic sub-micron particles and the epoxy resin. Useful sub-micron particles include sub-micron particles derived from silicon dioxide (silica) and calcium carbonate.

The provided compositions and methods thereof are further exemplified by the following representative embodiments, which should not be deemed to be exhaustive:

1. A curable composition comprising: a base part comprising an amine-reactive curable resin; and a curative part comprising a polymeric toughener dissolved in an amine, the polymeric toughener being solid at ambient conditions with a weight average molecular weight of at least 5,000 g/mol and the amine being a liquid at ambient conditions, wherein the curable composition can be cured by mixing the base and curative parts with each other.
2. The curable composition of embodiment 1, wherein the polymeric toughener comprises a rubbery polymer.
3. The curable composition of embodiment 2, wherein the rubbery polymer has a weight average molecular weight of at least 8,000 g/mol.
4. The curable composition of embodiment 3, wherein the rubbery polymer has a weight average molecular weight of at least 10,000 g/mol.
5. The curable composition of embodiment 4, wherein the rubbery polymer has a weight average molecular weight in the range of from 10,000 g/mol to 1,000,000 g/mol.
6. The curable composition of any one of embodiments 1-5, wherein the polymeric toughener contains an amine group that is reactive with the amine-reactive curable resin.
7. The curable composition of embodiment 6, wherein the polymeric toughener comprises one or more of polytetrahydrofuran amine, polybutadiene, and acrylonitrile butadiene rubber.
8. The curable composition of embodiment 7, wherein the polymeric toughener comprises polytetrahydrofuran amine and further wherein the polytetrahydrofuran amine is branched.
9. The curable composition of any one of embodiments 1-8, wherein the polymeric toughener is present in an amount of from 1 percent to 60 percent by weight, based on the overall weight of the curable composition.
10. The curable composition of embodiment 9, wherein the polymeric toughener is present in an amount of from 5 percent to 40 percent by weight, based on the overall weight of the curable composition.
11. The curable composition of embodiment 10, wherein the polymeric toughener is present in an amount of from 5 percent to 30 percent by weight, based on the overall weight of the curable composition.
12. The curable composition of any one of embodiments 1-11, wherein the polymeric toughener comprises a thermoplastic polymer.
13. The curable composition of embodiment 12, wherein the thermoplastic polymer has a weight average molecular weight of at least 10,000 g/mol.
14. The curable composition of embodiment 13, wherein the thermoplastic polymer has a weight average molecular weight of at least 20,000 g/mol.
15. The curable composition of any one of embodiments 12-14, wherein the thermoplastic polymer comprises one or more of poly(hydroxyl ether of bisphenol A), poly(phenyl oxide), poly(ether ether ketone), poly(ether sulfone), poly(vinyl butyral), poly(methyl methacrylate) and polyamide.
16. The curable composition of any one of embodiments 12-15, wherein the thermoplastic polymer lacks any amine group that is reactive with the amine-reactive curable resin.
17. The curable composition of any one of embodiments 12-15, wherein the thermoplastic polymer contains an amine group that is reactive with the amine-reactive curable resin.
18. The curable composition of any one of embodiments 1-17, wherein the amine-reactive curable resin comprises an epoxy resin.
19. The curable composition of any one of embodiments 1-18, wherein the amine alone has a viscosity of from 1 centipoise to 10,000 centipoise at ambient conditions.
20. The curable composition of embodiment 19, wherein the amine alone has a viscosity of from 1 centipoise to 1000 centipoise at ambient conditions.
21. The curable composition of embodiment 20, wherein the amine alone has a viscosity of from 1 centipoise to 500 centipoise at ambient conditions.
22. The curable composition of any one of embodiments 1-21, wherein the amine comprises one or more of tetraethylenepentamine, N-aminoethylpiperazine, bis(aminopropyl)piperazine, diethylenetriamine, triethylenetramine, 4,7,10-trioxatridecane-1,13-diamine, octahydro-4,7-methano-1H-indenedimethylamine, bicyclo[2.2.1]heptanebis(methylamine), meta-xylenediamine, isophoronediamine, and cyclohexanediamine.
23. The curable composition of any one of embodiments 1-22, wherein the amine is present in an amount of from 45 percent to 95 percent by weight, based on the overall weight of the curative part.
24. The curable composition of embodiment 23, wherein the amine is present in an amount of from 50 percent to 95 percent by weight, based on the overall weight of the curative part.
25. The curable composition of embodiment 24, wherein the amine is present in an amount of from 60 percent to 95 percent by weight, based on the overall weight of the curable composition.
26. The curable composition of any one of embodiments 1-25, wherein the base part further comprises a multifunctional epoxy having an epoxy functionality greater than 2.
27. The curable composition of embodiment 26, wherein the multifunctional epoxy comprises tetraglycidyl methylenedianiline.
28. The curable composition of embodiment 26 or 27, wherein the multifunctional epoxy is present in an amount of from 0.1 percent to 70 percent by weight, based on the overall weight of the curable composition.
29. The curable composition of embodiment 28, wherein the multifunctional epoxy is present in an amount of from 5 percent to 50 percent by weight, based on the overall weight of the curable composition.
30. The curable composition of embodiment 29, wherein the multifunctional epoxy is present in an amount of from 5 percent to 40 percent by weight, based on the overall weight of the curable composition.
31. The curable composition of any one of embodiments 1-30, wherein the base part or curative part further comprises core shell rubber particles.
32. The curable composition of embodiment 31, wherein the core shell rubber particles comprise a polybutadiene core and polymethylmethacrylate shell.
33. The curable composition of embodiment 31 or 32, wherein the core shell rubber particles are present in an amount of from 0.1 percent to 20 percent, based on the overall weight of the curable composition.

34. The curable composition of embodiment 33, wherein the core shell rubber particles are present in an amount of from 1 percent to 20 percent, based on the overall weight of the curable composition.
35. The curable composition of embodiment 34, wherein the core shell rubber particles are present in an amount of from 5 percent to 15 percent, based on the overall weight of the curable composition.
36. The curable composition of any one of embodiments 1-35, wherein the base part or curative part further comprises fumed silica.
37. The curable composition of embodiment 36, wherein the fumed silica is present in an amount of from 0.1 percent to 10 percent, based on the overall weight of the curable composition.
38. The curable composition of embodiment 37, wherein the fumed silica is present in an amount of from 0.5 percent to 6 percent, based on the overall weight of the curable composition.
39. The curable composition of embodiment 38, wherein the fumed silica is present in an amount of from 0.5 percent to 4 percent, based on the overall weight of the curable composition.
40. The curable composition of any one of embodiments 1-39, wherein the base part further comprises a rubbery polymer having a weight average molecular weight of from 5,000 g/mol to 1,000,000 g/mol.
41. The curable composition of embodiment 40, wherein the rubbery polymer present in the base part is also present in the curative part.
42. The curable composition of embodiment 40 or 41, wherein the weight ratio of the polymeric toughener in the curative part to the rubbery polymer in the base part is from 10:0 to 1:9.
43. The curable composition of embodiment 42, wherein the weight ratio of the polymeric toughener in the curative part to the rubbery polymer in the base part is from 10:0 to 5:5.
44. The curable composition of embodiment 43, wherein the weight ratio of the polymeric toughener in the curative part to the rubbery polymer in the base part is from 10:0 to 8:2.
45. The curable composition of any one of embodiments 1-41, wherein the base part further comprises a thermoplastic polymer having a weight average molecular weight of from 5,000 g/mol to 10,000,000 g/mol.
46. The curable composition of embodiment 42, wherein the thermoplastic polymer present in the base part is also present in the curative part.
47. The curable composition of embodiment 45 or 46, wherein the weight ratio of the polymeric toughener in the curative part to the thermoplastic polymer in the base part is from 10:0 to 1:9.
48. The curable composition of embodiment 47, wherein the weight ratio of the polymeric toughener in the curative part to the thermoplastic polymer in the base part is from 10:0 to 5:5.
49. The curable composition of embodiment 48, wherein the weight ratio of the polymeric toughener in the curative part to the thermoplastic polymer in the base part is from 10:0 to 8:2.
50. A cured composition obtained by curing the curable composition of any one of embodiments 1-49.
51. A method of making a two-part curable composition, the method comprising: providing a base part comprising one or more amine-reactive curable resins; and obtaining a curative part by dissolving a polymeric toughener in an amine that is liquid at ambient conditions, wherein the polymeric toughener comprises a rubbery polymer, thermoplastic polymer, or combination thereof, each polymeric toughener being solid at ambient conditions and having a weight average molecular weight of at least 5,000 g/mol; wherein the base part and curative part are reactive upon mixing with each other to obtain a cured composition.
52. The method of embodiment 51, wherein the base part and curative part are reactive upon mixing with each other at ambient temperature to obtain a cured composition.
53. A method of curing a composition, the method comprising: dissolving a polymeric toughener in an amine to obtain a curative, wherein the polymeric toughener comprises a rubbery polymer, thermoplastic polymer, or combination thereof, each polymeric toughener being solid at ambient conditions and having a weight average molecular weight of at least 5,000 g/mol, and the amine being a liquid at ambient conditions; and mixing the curative with an amine-reactive curable resin to obtain a cured composition.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

| Materials | | |
| --- | --- | --- |
| Designation | Description | Source |
| EPON 828 | Diglycidyl ether of bisphenol A with an approximate epoxy equivalent weight of 187.5 g/mol, obtained under the trade designation "EPON 828" | Hexion Specialty Chemicals, Houston, TX |
| MX 257 | Diglycidyl ether of bisphenol A with a core shell rubber toughener having an approximate epoxy equivalent weight of 298 g/mol, obtained under the trade designation "MX 257" | Kaneka Corporation, Pasadena, TX |
| MY-721 | Multifunctional tetraglycidyl methylenedianiline (TGMDA), obtained under the trade designation "ARALDITE MY-721 | Huntsman Advanced Chemicals, Woodlands, TX |

TABLE 1-continued

Materials

| Designation | Description | Source |
|---|---|---|
| TCD diamine | CAS # 68889-71-4 | Oxea Chemicals, Dallas, TX |
| Calcium nitrate tetrahydrate | Calcium nitrate tetrahydrate | Aldrich Chemical, Milwaukee, WI |
| K-54 | Tertiary amine accelerator, 2,4,6-tri(dimethylaminomethyl) phenol, available under the trade designation "K-54" | Air Products and Chemicals, Inc., Allentown, PA |
| Vulcan XC-72R | Carbon black, available under the trade designation "Vulcan XC-72R" | Cabot, Boston, MA |
| Aluminum panel | Grade 2024T3 bare aluminum panel of various sizes specified for each test were used to generate all OLS and FRP data for all examples. | Erickson Metals of Minnesota, Inc., Coon Rapids, MN |
| TS 720 | Synthetic, hydrophobic, amorphous silica produced via flame hydrolysis, available under the trade designation "TS 720" | Revchem, Bloomington, CA |
| EPX | A high molecular weight (approximately 9,000-15,000 g/mol weight average molecular weight) amine terminated branched polytetramethylene oxide, available under the trade designation "3M EPX RUBBER" | 3M Co., St. Paul, MN |
| POLYTHF 1700 | Poly-tetrahydrofuranamine 1700, a diamine of approximately 1700 average molecular weight based on a polytetra methylene oxide, obtained under the trade designation "POLYTHF AMINE 1700" | BASF Corp., Ludwigshafen, Germany |
| Z-6040 | A glycioxypropyltrimethoxysilane coupling agent, available under the trade designation "Z-6040" | Dow Corning, Midland, MI |
| NBDA | Norbornane diamine, available under the trade designation "PRO-NBDA" | Mitsui Fine Chemicals, Inc., Tokyo, Japan. |
| PKHP-200 | Micronized PKHH grade phenoxy resin, 110 micrometer average, available under the trade designation "PKHP-200" | Gabriel Performance Products, Akron, OH |
| ASP-200 | Hydrous aluminosilicate particles with average diameter 20-30 micrometers, available under the trade designation "ASP-200" | BASF Corp., Ludwigshafen, Germany |

Test Methods

Prior to bonding with structural adhesive, Grade 2024T3 bare aluminum panels were subjected to the following surface preparation process:

FPL Etched and Phosphoric Acid Anodized and Primed Aluminum Substrate

Aluminum panels were treated as follows before bonding:
1) soaking for 10 minutes in OAKITE 165 CAUSTIC WASH SOLUTION (available from Chemetall GmbH, Germany) at a temperature of 85° C.;
2) the panels (in a rack) were then submerged in tank of deionized water for 10 minutes;
3) the panels were spray rinsed with deionized water for 2-3 minutes;
4) the panels were then soaked in a tank of "FPL ETCH" (a hot solution of sulfuric acid and sodium dichromate from Forest Products Laboratory of Madison, Wis.) at 66° C. for 10 minutes;
5) the panels were spray rinsed with deionized water for 2-3 minutes; and
6) the panels were allowed to drip dry for 10 minutes at ambient temperature, and then for 30 minutes in a re-circulating air oven at 54° C.

In all cases, the panels were further treated as follows. The etched panels were anodized by immersion in phosphoric acid at 22° C. with an applied voltage of 15 volts for 20-25 minutes, followed by rinsing with tap water (test for water break), air drying for 10 minutes at room temperature, then oven drying in a forced air oven at 66° C. for 10 minutes. The resulting anodized aluminum panels were then primed within 24 hours of treatment. The anodized panels were primed with a corrosion inhibiting primer for aluminum ("3M SCOTCH-WELD STRUCTURAL ADHESIVE PRIMER EW-5000", available from 3M, St. Paul, Minn.) according to the manufacturer's instructions to give a dried primer thickness of between 0.00015 and 0.00025 inch (2.6 to 5.2 micrometers).

Overlap Shear ("OLS") Testing

Primed panels of 2024-T3 bare aluminum measuring 4 inches long by 7 inches wide by 0.063 inches thick (about 10.16 cm by 17.78 cm by 0.16 cm) were prepared for testing as described above in "FPL Etched and Phosphoric Acid Anodized Aluminum Substrate". The primed panels were bonded to one another in an overlapping relationship along their lengthwise dimension using a well-mixed paste structural adhesive sample (parts A and B mixed in a high speed mixer at 2200 rpm for about 30 seconds). The resulting assembly was fastened together using tape and was pressed by metal blocks to give a pressure of 2-5 psi (14-34 kPa) and cured at room temperature overnight. The bonded panels were then removed and postcured at 250° F. (121° C.) for 30-60 mins for optimized performance. Then the panels were sawn across their width into 1 inch (2.54 cm) wide strips and evaluated for overlap shear strength in accordance with ASTM D-*1002 using a grip separation rate of 0.05 inches/minute (1.3 millimeters/minute) using a tensile tester. Testing was conducted at room temperature (75° F., 24° C.) and at elevated temperature, as specified. A SINTECH 30 test machine (MTS Corporation, Eden Prairie, Minn.) was used for Overlap Shear Testing in accordance with ASTM D-1002.

Floating Roller Peel Strength Test for Adhesive Film

Primed panels of 2024-T3 bare aluminum measuring 8 inches long times 3 inches wide times 0.063 inches thick (20.3 times 7.6 times 0.16 centimeters), and 10 inches long times 3 inches wide times 0.025 inches thick (25.4 times 7.6 times 0.064 centimeters), were prepared for testing as described above in "FPL Etched and Phosphoric Acid Anodized Aluminum Substrate". The primed panels were bonded together using the same structural adhesive sample and cure process employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch. A SINTECH 20 test machine (MTS Corporation, Eden Prairie, Minn.) was used for Floating Roller Peel Testing in accordance with ASTM D-3167-76.

Formulation of Curative Side—Part A (Table 2):
1. Toughener (POLYTHF 1700 or EPX) and amine were added into a flask or cup. Heated to 80° C. and waited for the toughener to dissolve. Speed mixed again for 1-2 mins again.
2. MX 257 was added (if the formulation included this ingredient), and speed mixed for 2-4 mins. Heated to 80° C. and speed mix for 4-5 mins again, held at this temperature for 1-2 hours to complete the amine extension reaction. Cooled the mixture to room temperature.
3. Added calcium nitrate tetrahydrate and K-54 to the mixture (if included in the formulation), and then speed mix for 3-5 min at 2200 rpm until homogeneous.
4. Added TS 720 silica and speed mix for 4 min at 2200 rpm, hand mixed (scraping walls of mixing cup), then remixed at 2200 rpm for 2 mins.
5. Added other ingredients if needed (e.g., filler) and speed mixed again until well mixed.

TABLE 2

Part A formulations (parts by weight)

| Samples | A1 | A2 | A3 | A4 | A5 | A6 |
|---|---|---|---|---|---|---|
| R 816 | 3.6 | 3.6 | 3.6 | 3.0 | 0 | 0 |
| MX 257 | 22 | 22 | 0 | 0 | 0 | 43.8 |
| NBDA | 0 | 0 | 0 | 58 | 62 | 58 |
| TCD diamine | 80 | 80 | 80 | 0 | 0 | 0 |
| TS 720 | 0 | 0 | 0 | 0 | 3.0 | 3 |
| Filler (aluminum particles with ave. diameter 20-30 micrometers) | 0 | 0 | 0 | 0 | 0 | 5 |
| POLYTHF 1700 | 30 | 0 | 0 | 0 | 0 | 0 |
| EPX | 0 | 30 | 50 | 25 | 32 | 0 |
| K-54 | 0 | 0 | 0 | 0 | 2.0 | 4.5 |
| Calcium nitrate tetrahydrate | 0 | 0 | 0 | 0 | 2 | 0 |

Formulation of Epoxy Side—Part B (Table 3):
1. EPON 828, MX-257 and MY 721 were mixed in a speed mixer for 2-3 min at 2200 rpm until homogeneous. The resin was warmed up if needed to assist the mixing.
2. The TS 720 or R816 fumed silica were added and speed mixed for at least 4 min at 2200 rpm, then hand mixed (scraping walls of mixing cup) and speed mixed again until well mixed.

TABLE 3

Part B formulations (parts by weight)

| Samples | B1 | B2 | B3 | B4 | B5 | B6 |
|---|---|---|---|---|---|---|
| EPON 828 | 30 | 30 | 25 | 15 | 24 | 9 |
| MY 721 | 100 | 100 | 75 | 58.5 | 99 | 99 |
| MX 257 | 140 | 140 | 83 | 75 | 169 | 125.2 |
| R816 | 2.0 | 2.0 | 1.0 | 1.5 | 0 | 0 |
| TS 720 | 0 | 0 | 0 | 0 | 4 | 2 |

Samples of A and B formulations were mixed in the weight ratios indicated in Tables 2 and 3 to generate examples of a structural adhesive mixture. Test results for the structural adhesive mixtures were as summarized in Table 4.

Another set of examples was generated, using the following materials and procedures.

Formulation of Curative Side—Part A (Table 5):
1. Added PKHP 200 and either TCD diamine or NBDA into a flask or cup. Heated to 80° C. until dissolved. Speed mixed again for 1-2 mins again. Cooled the mixture to room temperature.
2. Added calcium nitrate tetrahydrate and K-54, to the mixture and then speed mix for 3-5 min at 2200 rpm until homogeneous.
3. Added TS 720 silica and speed mix for 4 min at 2200 rpm, hand mixed (scraping walls of mixing cup), then remixed at 2200 rpm for 2 mins.

Formulation of Epoxy Side—Part B (Table 6):
1. EPON 828, MX-257 and MY 721 were mixed in a speed mixer for 2-3 min at 2200 rpm until homogeneous. The resin was warmed up if needed to assist the mixing.
2. The TS 720 fumed silica and other ingredients were added and speed mixed for at least 4 min at 2200 rpm, then hand mixed (scraping walls of mixing cup) and speed mixed again until well mixed.

Samples of A and B formulations were mixed in the weight ratios indicated in Tables 5 and 6 to generate examples of a structural adhesive mixture. Test results for the structural adhesive mixtures were as summarized in Table 7 after leaving the bonded specimen at ambient temperature overnight and a post cure bake cycle at 120° C. for 60 minutes.

TABLE 4

| Example | Mix ratio, by weight | OLS at about 23° C., psi (MPa) | OLS at 250° F. (121° C.), psi (MPa) | OLS at 300° F. (149° C.), psi (MPa) | OLS at 350° F. (177° C.), psi (MPa) | FRP at about 23° C., piw (N/25 mm) | Core-shell (MX 257) amount, wt. % relative to total mixture | Toughener amount, wt. % relative to total mixture |
|---|---|---|---|---|---|---|---|---|
| CE-1 | 2:1 (B1:A1) | 4480 (30.90) | 2230 (15.38) | 1767 (12.19) | 1451 (10.01) | 18.5 (81.4) | 14.7 | 7.4 |
| EX-1 | 2:1 (B2:A2) | 3614 (24.92) | 2188 (15.09) | 1829 (12.61) | 1595 (11.00) | 26.0 (114) | 14.7 | 7.4 |
| EX-2 | 2:1 (B3:A3) | 4752 (32.77) | 2744 (18.92) | 2002 (13.81) | 2050 (14.14) | 21.5 (94.6) | 11.1 | 12.5 |
| EX-3 | 3:1 (B4:A4) | 3187 (21.98) | 2072 (14.29) | 1587 (10.94) | 1466 (10.11) | 13.2 (58.1) | 13.9 | 7.3 |
| EX-4 | 3:1 (B5:A5) | 3904 (26.92) | 1841 (12.70) | 2037 (14.05) | 1614 (11.13) | 22.5 (99.0) | 15.8 | 7.9 |
| CE-2 | 2:1 (B6:A6) | 3147 (21.70) | 2525 (17.41) | 2087 (14.39) | 1572 (10.84) | 14.3 (62.9) | 18.2 | 0 |

TABLE 5

Part A formulations (parts by weight)

| Samples | A7 | A8 | A9 | A10 |
|---|---|---|---|---|
| PKHP-200 | 0 | 36 | 15 | 15 |
| NBDA | 0 | 0 | 62 | 62 |
| TCDA | 120 | 120 | 0 | 0 |
| TS 720 | 3 | 3 | 2 | 2 |
| Calcium nitrate tetrahydrate | 1.5 | 1.5 | 1.5 | 1.5 |

TABLE 6

Part B formulations (parts by weight)

| Samples | B7 | B8 | B9 | B10 |
|---|---|---|---|---|
| EPON 828 | 50 | 50 | 50 | 50 |
| MY 721 | 170 | 170 | 170 | 170 |
| MX 257 | 125 | 125 | 125 | 125 |
| Z-6040 | 5 | 5 | 0 | 5 |
| TS 720 | 2.0 | 2.0 | 2.0 | 2.0 |

TABLE 7

| Example | Mix ratio, by weight | OLS about 23° C., psi (MPa) | OLS at 350° F. (177° C.), psi (MPa) | FRP at about 23° C., piw (N/25 mm) | Core-shell (MY 257) amount, wt. % relative to total mixture | Toughener (PKHP-200) amount, wt. % relative to total mixture |
|---|---|---|---|---|---|---|
| CE-3 | 3:1 (B7:A7) | 4289 (29.58) | 1786 (12.32) | 8 (35) | 9.9 | 0 |
| EX-5 | 2.5:1 (B8:A8) | 4576 (31.56) | 2131 (14.70) | 16 (70) | 9.2 | 6.6 |
| EX-6 | 3:1 (B9:A9) | 4023 (27.74) | 1902 (13.12) | 11 (48) | 9.9 | 4.5 |
| EX-7 | 3:1 (B10:A10) | 4022 (27.74) | 1978 (13.64) | 9 (40) | 10 | 4.5 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-part curable composition comprising:
   a base part comprising an amine-reactive curable resin; and
   a curative part comprising a polymeric toughener dissolved in an amine to incorporate the polymeric toughener and the amine into a homogeneous liquid solution which is not a dispersion, the polymeric toughener being solid at ambient conditions with a weight average molecular weight of at least 5,000 g/mol and the amine being liquid at ambient conditions,
   wherein the curable composition can be cured by mixing the base and curative parts with each other.

2. The curable composition of claim 1, wherein the polymeric toughener comprises a rubbery polymer.

3. The curable composition of claim 2, wherein the rubbery polymer has a weight average molecular weight of at least 10,000 g/mol.

4. The curable composition of claim 1, wherein the polymeric toughener contains an amine group that is reactive with the amine-reactive curable resin.

5. The curable composition of claim 4, wherein the polymeric toughener comprises one or more of polytetrahydrofuran amine, polybutadiene, and acrylonitrile butadiene rubber.

6. The curable composition of claim 1, wherein the polymeric toughener comprises a thermoplastic polymer.

7. The curable composition of claim 6, wherein the thermoplastic polymer has a weight average molecular weight of at least 20,000 g/mol.

8. The curable composition of claim 6, wherein the thermoplastic polymer lacks any amine group that is reactive with the amine-reactive curable resin.

9. The curable composition of claim 6, wherein the thermoplastic polymer comprises one or more of poly(hydroxyl ether of bisphenol A), poly(phenyl oxide), poly(ether ether ketone), poly(ether sulfone), poly(vinyl butyral), poly(methyl methacrylate) and polyamide.

10. The curable composition of claim 1, wherein the amine comprises one or more of tetraethylenepentamine, N-aminoethylpiperazine, bis(aminopropyl)piperazine, diethylenetriamine, triethylenetetramine, 4,7,10-trioxatridecane-1,13-diamine, octahydro-4,7-methano-1H-indenedimethylamine, bicyclo[2.2.1]heptanebis(methylamine), meta-xylenediamine, isophoronediamine, and cyclohexanediamine.

11. The curable composition of claim 1, wherein the base part further comprises a multifunctional epoxy having an epoxy functionality greater than 2.

12. The curable composition of claim 11, wherein the multifunctional epoxy comprises tetraglycidyl methylenedianiline.

13. The curable composition of claim 1, wherein the base part further comprises a rubbery polymer or thermoplastic polymer having a weight average molecular weight of from 5,000 g/mol to 10,000,000 g/mol.

14. A method of making a two-part curable composition, the method comprising:
providing a base part comprising one or more amine-reactive curable resins; and
obtaining a curative part by dissolving a polymeric toughener in an amine that is liquid at ambient conditions to incorporate the polymeric toughener and the amine into a homogeneous liquid solution which is not a dispersion, wherein the polymeric toughener comprises a rubbery polymer, thermoplastic polymer, or combination thereof, each polymeric toughener being solid at ambient conditions and having a weight average molecular weight of at least 5,000 g/mol;
wherein the base part and curative part are reactive upon mixing with each other to obtain a cured composition.

15. A method of curing a two-part curable composition, the method comprising:
dissolving a polymeric toughener in an amine, the polymeric toughener and the amine being incorporated into a homogeneous liquid solution which is not a dispersion, to obtain a curative, wherein the polymeric toughener comprises a rubbery polymer, thermoplastic polymer, or combination thereof, each polymeric toughener being solid at ambient conditions and having a weight average molecular weight of at least 5,000 g/mol, and the amine being a liquid at ambient conditions; and
mixing the curative with an amine-reactive curable resin to obtain a cured composition.

* * * * *